S. L. BRYSON.
TONGUE SUPPORT FOR VEHICLES.
APPLICATION FILED MAY 22, 1914.
1,123,239.
Patented Jan. 5, 1915.
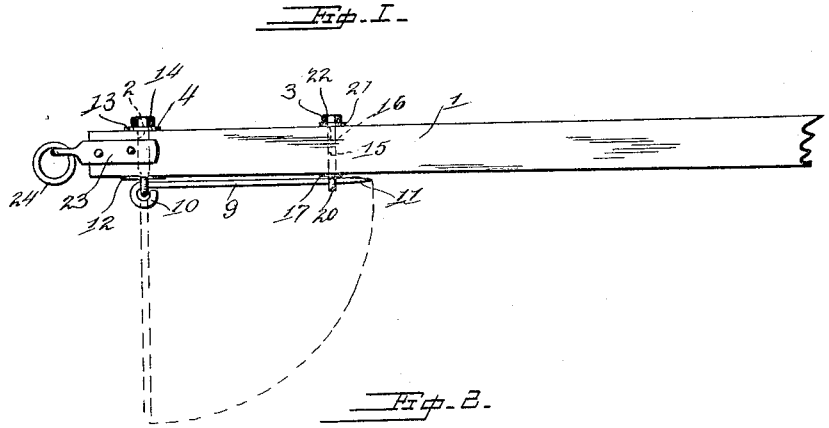
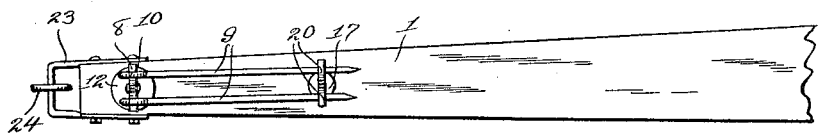
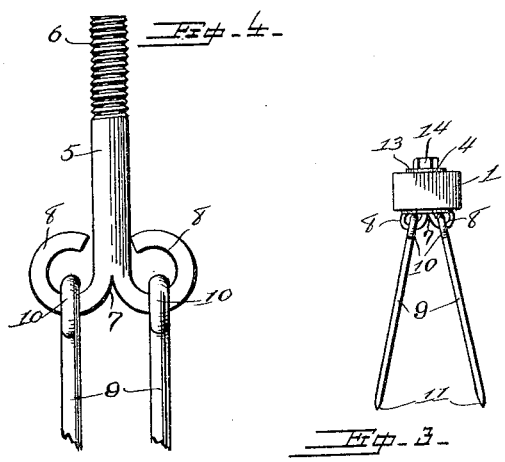
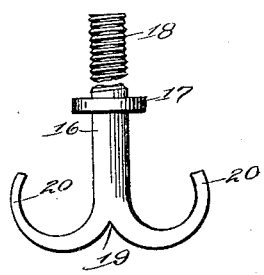
Inventor
Samuel L. Bryson.
Witnesses
Edw. S. Hall.
Hm. H. Downing.
By Richard B. Owen.
Attorney

UNITED STATES PATENT OFFICE.

SAMUEL L. BRYSON, OF BATTLE CREEK, COLORADO.

TONGUE-SUPPORT FOR VEHICLES.

1,123,239.  Specification of Letters Patent.  Patented Jan. 5, 1915.

Application filed May 22, 1914. Serial No. 840,326.

*To all whom it may concern:*

Be it known that I, SAMUEL L. BRYSON, a citizen of the United States, residing at Battle Creek, in the county of Routt and State of Colorado, have invented certain new and useful Improvements in Tongue-Supports for Vehicles, of which the following is a specification.

My invention relates to tongue supports for vehicles.

The primary object of my invention resides in the provision of improved means for supporting the tongue of a vehicle when not in use and has improved means coöperating therewith for retaining the support in an inoperative position.

Another object of my invention resides in the construction of the attaching means for the support, the attaching means being mounted on the tongue.

A further object of my invention resides in the improved form of retaining means having means formed thereon for limiting the movement of the same, the limiting means also serving in a capacity for preventing undue wear on the tongue.

A still further object of my invention resides in the provision of a tongue support that is simple in construction, efficient in operation and one that can be manufactured and placed on the market at a minimum cost.

Other objects as well as the nature, characteristic features and scope of my invention will be more readily understood from the following description taken in connection with the accompanying drawings and pointed out in the claims forming a part of this specification.

Referring to the drawings:—Figure 1 is a side elevational view of a portion of a tongue showing my invention applied thereto; Fig. 2 is a bottom plan view of the same; Fig. 3 is an end elevational view; Fig. 4 is a fragmentary elevational view of the supporting members and the attaching means therefor; and Fig. 5 is an elevational view of the retaining means for the supporting member.

Referring more particularly to the drawings wherein similar reference numerals designate corresponding parts throughout the different views, I provide a tongue 1 of a vehicle with a pair of spaced openings 2 and 3 and have detachably mounted through these openings the tongue support and the retaining means therefor.

The tongue support which is generally designated 4 in this instance comprises a securing element having a shank 5 for engagement with the opening, the upper end of which shank is screw threaded as at 6. The opposite end of the element is split as at 7 and has the portions thereof bent outwardly to form corresponding loops 8 for engagement with the supporting members 9, the latter being engaged upon the loops before they are closed. The supporting members in this instance consist of pieces of rod metal which have one of their ends bent to form loops 10 for engagement with the loops 8 of the securing element and have their free ends sharpened to points 11 which facilitate the engagement of the same with hard surfaces and prevent the same from slipping.

In attaching the shank 5 of the securing element in the opening 2 and for the purpose of preventing undue wear on the tongue, I have disposed a washer 12 upon the shank and positioned the same between the under surface of the tongue and the upper surface of the loops 8. The shank is inserted in the opening and another washer 13 is disposed about the upper screw threaded end before the nut 14 is engaged on the same for securely holding the attaching member in place.

For the purpose of retaining the supporting members 9 in an inoperative position I have secured the retaining means generally designated 15 in the opening 3 which is positioned in alinement and in spaced relation to the opening 2. The retaining element comprises a shank 16 having an annular collar 17 formed thereon at a point intermediate the ends of the same, the upper end of which shank is screw threaded as at 18 and the opposite end is slit as at 19 and the portions adjacent the same are bent upwardly in opposite directions to form retaining hooks 20, the free ends of which are arranged in suitable spaced relation with the under surface of the collar to allow for the insertion of the supporting members 9 when the same are being placed within the members 20. The hook members 20 are disposed transversely across the under surface of the tongue and in spaced parallel relation with the loops 8. In attaching the retaining means the screw threaded end of the shank is placed within the opening 3 from the under side of the tongue and a washer 21 is then placed about the same for preventing undue wear on the upper surface of the tongue likely to be caused by the nut 22 screw threaded on the end 18 thereof for securely holding the same in position. It can be easily seen that the collar 17 besides preventing wear on the tongue limits the upward movement of the shank 16 when the same is being attached and allows for the free insertion of the supporting members 9 into the hook members 20. For facilitating the attachment of draft animals to the tongue I have provided the outer end of the latter with a pole tip 23 loosely carrying a ring 24 for engagement with a draft device.

The operation of my device is as follows:—When detaching a horse from a vehicle the supporting members 9 are lifted from engagement with the hook members 20, whereupon they drop downward about their pivot point into engagement with the ground. Due to the weight of the tongue, the points 11 of the members firmly engage the ground and prevent the same from slipping. In the event that it is down grade the members can be swung at an angle to prevent the moving of the vehicle due to the universal connection between the loops 8 and 10.

Although I have shown and described the preferred embodiment of my invention it is to be understood that I am not limited to the exact details, however, I desire that great stress be laid upon the connection between the supporting members and the attaching element and the coöperation of the retaining means therewith. Again, the collar 17 serves the dual purpose of limiting the movement of the shank 16 and preventing the undue wear on the tongue.

From the above description taken in connection with the accompanying drawings, it will be readily seen that I have provided a device that is simple in construction containing but a few simple parts that can be cheaply manufactured and easily assembled and when assembled can be placed on the market and sold at a minimum cost.

It will be understood that the above description and accompanying drawings comprehend only the general and preferred embodiment of my invention and that various minor changes in detail of construction, proportion and arrangement of the parts may be made within the scope of the appended claims and without sacrificing any of the advantages of my invention.

I claim:

1. The combination with a tongue of a vehicle, of a securing element, loops formed upon the lower end of the element by slitting the element and bending the portions adjacent the slit, supporting members for said tongue, loops formed upon the upper ends of the supporting members by bending the ends upon themselves, the loops of the members being in universal connection with the loops of the securing element, the free ends of said members being pointed for facilitating the engagement with the ground, and means for retaining said members in an inoperative position.

2. The combination with a tongue of a vehicle, of a securing element attached thereto, the lower end of said element being slit and having the portions adjacent the slit rolled upon themselves to provide loops, supporting members for said tongue, the upper ends of said supporting members being rolled upon themselves to provide loops for engagement with the loops of the securing element for establishing a universal connection between the members and the tongue, said members being capable of movement both laterally and longitudinally of the tongue, the free ends of said members being pointed to facilitate the engagement with the ground, and means for retaining said members in an inoperative position.

3. The combination with a tongue of a vehicle and a movably mounted support therefor, of a retaining means mounted on the tongue for receiving the free ends of the support, said means including a shank for engagement with a fastening device, said shank provided with means for limiting the movement thereof, and hook members formed by slitting the opposite end of the shank.

In testimony whereof I affix my signature in presence of two witnesses.

SAMUEL L. BRYSON.

Witnesses:
J. M. LEMMONS,
HARRY BRYSON.